United States Patent Office 3,534,089
Patented Oct. 13, 1970

3,534,089
PROCESS FOR THE PURIFICATION OF PARA-HYDROXYMETHYLBENZOIC ACID
Wolfang Wolfes, Witten-Bommern, and Gustav Renckhoff, Witten (Ruhr), Germany, assignors to Chemische Werke Witten GmbH., Witten (Ruhr), Germany
No Drawing. Filed June 28, 1965, Ser. No. 467,724
Claims priority, application Germany, July 15, 1964,
C 33,415
Int. Cl. C07c 65/02
U.S. Cl. 260—521                              8 Claims

ABSTRACT OF THE DISCLOSURE

A process for the purification of para-hydroxymethylbenzoic acid which comprises forming the sodium salt of said acid, crystallizing the sodium salt from a hot, concentrated aqueous solution thereof, preferably containing 20 to 50% by weight of the sodium salt, by cooling to room temperature, separating the mother liquor, and treating the obtained sodium salt with an acid to obtain the pure para-hydroxymenthylbenzoic acid.

---

This invention relates to para-hydroxymethylbenzoic acid. More particularly, it relates to a process for the purification of para-hydroxymethylbenzoic acid. Even more particularly, the invention relates to a process for the purification of para-hydroxymethylbenzoic acid by crystallization.

Numerous methods are known for the preparation of para-hydroxymethylbenzoic acid. Most of these are based on the saponification of a corresponding halogenmethyl compound, such as para-chloromethylbenzoic acid or the esters thereof or para-chloromethylbenzonitrile. For example, a thorough investigation concerning the preparation and polycondensation of para-hydroxymethylbenzoic acid has been described in the Journal für Praktische Chemie, 4th series, vol. 6, pages 103–114 (1958).

Para-hydroxymethylbenzoic acid must be free from by-products when it is to be employed in polycondensation reactions, such as in the preparation of polyesters. However, most of the known processes for the preparation of para-hydroxymethylbenzoic acid do not yield the acid free from by-products. Thus for example, during the saponification of highly pure para-chloromethylbenzoic acid in a faintly alkaline aqueous medium, up to 10% of dibenzylether-4,4'-dicarboxylic acid is always produced. This compound may be largely separated since, in contrast to para-hydroxymethylbenzoic acid, it is difficulty soluble in boiling water. However, even with recrystallizing of the para-hydroxymethylbenzoic acid two or three times from water or organic solvents it is only possible to obtain the acid product having a degree of purity of 97–98% with a melting range of 178°–181° C. Moreover, the acid crystallizes from the solvents employed as an aggregate of indistinctly formed crystals.

Purification of para-hydroxymethylbenzoic acid by distillation over an alkyl ester is plagued with problems since intrinsic condensates are formed during such a distillation while alcohol is split off.

One of the objects of the present invention is to provide an improved process for the purification of para-hydroxymethylbenzoic acid which overcomes the disadvantages and deficiencies of the prior art methods.

Another object of the present invention is to provide a process for the purification of para-hydroxymethylbenzoic acid which may be carried out in an efficacious and economical manner.

A further object of the invention is to provide a process for the purification of para-hydroxymethylbenzoic acid which gives the desired product in an extremely high degree of purity.

A still further object of the invention is to provide a process for the purification of para-hydroxymethylbenzoic acid which may be carried out easily and simply.

These and other objects of the present invention will become apparent to those skilled in the art from a reading of the following specification and claims.

In accordance with the present invention, it has been found that crude para-yhdroxymethylbenzoic acid may be purified by allowing the sodium salt of the acid to crystallize from a hot, concentrated aqueous solution thereof by cooling to room temperature (about 25° C.). Preferably, the solution contains about 20–50% by weight of the sodium salt. The desired pure para-hydroxymethylbenzoic acid is then obtained from the sodium salt in the conventional manner by reaction with an acid after separation of the mother liquor therefrom. The sodium salt which is crystallized can be prepared in any desired manner, for example, by reaction of the acid with sodium hydroxide.

It should be noted that the improved purification process of the present invention may follow a preliminary purification of crude para-hydroxymethylbenzoic acid; for example, separation of large amounts of difficulty soluble impurities, such as dibenzyl ether dicarboxylic acid, may be carried out by recrystallization of the acid from hot water. The process of the present invention may then follow such a preliminary purification step.

The purification process of the present invention provides a crystallization of the para-hydroxymethylbenzoic acid in uniformly shaped white needles. This product is of the high purity standard required for the preparation of polyesters by the polycondensation thereof with hydroxyl-containing compounds. This result is surprising be cause an equivalent purification of the acid cannot be achieved, for example, from the corresponding potassium salt or calcium salt.

For the purpose of purifying para-hydroxymethylbenzoic acid by the process of the present invention, the latter may be isolated first, after the saponification of a corresponding halogen compound, and thereafter a concentrated sodium salt solution of the acid prepared and the sodium salt isolated therefrom. However, the saponification may also be carried out from the start in such a manner that the sodium salt of the para-hydroxymethylbenzoic acid crystallizes out of the reaction solution. In this case, the saponification must be carried out in such a manner that not more than 10% by weight of by-products are formed.

The concentration of the sodium salt solution may vary within wide limits. In principle, it must be such that a portion of the sodium salt will crystallize during the cooling of the hot aqueous solution. However, the sodium salt should not reach a concentration of more than 50% since, in this case, a firm salt cake is produced which can be filtered only poorly and incompletely.

In order to make the process of the present invention economical, the acids obtained from the filtrate of the sodium salt solution are freed at boiling temperature (100° C.) by treatment with acid and filtered at 85°–100° C. As filter residue, there is obtained the insoluble acid portions, such as dibenzyl ether dicarboxylic acid, whereas para-hydroxymethylbenzoic acid crystallizes out of the hot filtrate. This acid product may then be subsequently purified again by way of the sodium salt treatment of the present invention or it may be added to the next batch.

The following examples are given merely as illustrative of the present invention and are not to be considered as limiting.

EXAMPLE I 200 grams of para-hydroxymethylbenzoic acid having a melting point of 178°–181° C. is dissolved in a solution of caustic soda (sodium hydroxide) at 95° to 100° C. The caustic soda solution contains 250 ml. of water and 55 grams of sodium hydroxide. The solution is allowed to cool while being stirred well. The sodium salt of the para-hydroxymethylbenzoic acid thereby crystallizes in the form of crystalline laminae. The salt cake obtained is suctioned off on a filter, dissolved again in 300 ml. of water at boiling temperature, and then the acid therein is freed with 90 grams of concentrated hydrochloric acid. While the solution cools slowly, the para-hydroxymethylbenzoic acid crystallizes in the form of long white needles. After cooling, the acid is suctioned off, washed with a little water and dried.

The first crystallizate amounts to 154 grams, which is 77% of the theoretical amount of acid. The melting point (corrected) of the thusly obtained para-hydroxymethylbenzoic acid is 181.5° C.

The filtrate separated from the sodium salt is diluted to double the quantity thereof, acidified at boiling temperature and rapidly filtered over a heatable filter. There is obtained therefrom 4.1 grams of insoluble acid. From the filtrate, there is crystallized 35.4 grams of para-hydroxymethylbenzoic acid which is suctioned off; 2.5 grams thereof remain dissolved in water.

The purification process is thereafter repeated with the 35.4 grams of acid obtained from the filtrate separated from the sodium salt. This second crystallizate gives 26 grams, 13% of the theoretical amount of acid; the melting point thereof (corrected) is 181.5° C.

The purification process may also be repeated a third time. Of course, the yields of acid obtained in each succeeding purification may be added together to give a total good yield of high purity para-hydroxymethylbenzoic acid.

The purification process proceeds even more favorably if the acid filtrate is concomitantly used in a next batch after the first separation of the sodium salt and after the separation of the main amount of water-soluble acid.

EXAMPLE II 184 grams of distilled para-chloromethylbenzoic acid methyl ester is stirred well with 200 ml. of water at boiling temperature with the addition of 2 grams of emulsifier. Some phenolphthalein is added thereto as indicator. A solution of caustic soda (80 grams of sodium hydroxide in 200 ml. of water) is slowly added thereto through a dropping funnel such that the indicator just turns to red. The ester is thus completely saponified within approximately five hours.

After cooling, the crystallized sodium salt is suctioned off and washed with some ice water. The salt cake is dissolved in 130 ml. of water and para-hydroxymethylbenzoic acid is precipitated therefrom with hydrochloric acid. 61 grams of pure acid is isolated, which is equal to 40.5% of the theoretical amount. The filtrate is acidified with hydrochloric acid at boiling temperature and filtered over a heatable filter plate. Isolated from the filtrate in 9.5 grams of water-insoluble acid. From the filtrate, there is obtained 75.5 grams of para-hydroxymethylbenzoic acid which may be purified by way of the sodium salt treatment described in Example I. The total yield isolated is 126 grams of the purest para-hydroxymethylbenzoic acid, which is equal to 83.4% of the theoretical amount.

The invention being thus described, it will be obvious that the same may be varied in many ways. It should be understood that the above-described examples are merely illustrative of the principles of the present invention, and that various modifications, which would be obvious to one skilled in the art, are deemed to be within the spirit and scope thereof.

We claim:
1. A process for the purification of para-hydroxymethylbenzoic acid to substantially remove dibenzylether-4,4'-dicarboxylic acid therefrom which comprises forming the sodium salt of para-hydroxymethylbenzoic acid, cooling a hot aqueous solution consisting essentially of said sodium salt to room temperature to obtain crystals of said sodium salt, separating the mother liquor, and treating the obtained sodium salt with an acid to obtain pure para-hydroxymethylbenzoic acid, whereby the obtained acid is of sufficient purity for the preparation of polyesters by polycondensation with hydroxyl-containing compounds.

2. The process of claim 1, wherein said para-hydroxymethylbenzoic acid is preliminarily purified.

3. The process of claim 1, wherein said sodium salt of para-hydroxymethylbenzoic acid is prepared by reacting para-hydroxymethylbenzoic acid with sodium hydroxide.

4. The process of claim 2, wherein the preliminary purification step comprises recrystallization of the para-hydroxymethylbenzoic acid from hot water in order to remove difficulty soluble impurities therefrom.

5. The process of claim 1, wherein the filtrate obtained from said crystallizing step is treated by acidification and filtration so as to obtain crude para-hydroxymethylbenzoic acid therefrom, said crude acid then being purified in accordance with the process steps of claim 6, this procedure being repeated with each successive filtrate as many times as desired.

6. The process of claim 1, wherein the filtrate obtained from said crystallizing step is treated by acidification and filtration so as to obtain crude para-hydroxymethylbenzoic acid therefrom, said crude acid being added to the next batch to be purified in accordance with the process steps of claim 1.

7. A process for the purification of para-hydroxymethylbenzoic acid to substantially remove dibenzylether-4,4'-dicarboxylic acid therefrom which comprises forming the sodium salt of para-hydroxymethylbenzoic acid, cooling a hot, concentrated aqueous solution consisting essentially of 20 to 50% by weight of said sodium salt to room temperature, separating the mother liquor, and treating the obtained sodium salt with an acid to obtain pure para-hydroxymethylbenzoic acid, whereby the obtained acid is of sufficient purity for the preparation of polyesters by polycondensation with hydroxyl-containing compounds.

8. The process of claim 7, wherein said para-hydroxymethylbenzoic acid is preliminarily purified.

References Cited

UNITED STATES PATENTS 2,562,861  11/1949  Deusel et al. _____ 260—525

FOREIGN PATENTS 316,703  8/1929  Great Britain.
809,767  3/1959  Great Britain.

OTHER REFERENCES

Gattermann: "Organic Chemistry," MacMillan, London, 1896, pp. 1, 9–11.

Morrison et al.: "Organic Chemistry," Allyn & Bacon, New York, 1959, pp. 438–9.

Morton: "Laboratory Techniques in Org. Chem.," McGraw-Hill, New York, 1938, pp. 147–9.

Vogel: "Practical Org. Chem.," Longmanns, New York, 1948, pp. 122–3, 677.

Lassar-Cohn: "Manual of Org. Chem.," MacMillan, London, 1896, pp. 330, 336.

LORRAINE A. WEINBERGER, Primary Examiner

D. STENZEL, Assistant Examiner